(12) United States Patent
Sugimoto et al.

(10) Patent No.: US 8,886,357 B2
(45) Date of Patent: Nov. 11, 2014

(54) REINFORCEMENT LEARNING APPARATUS, CONTROL APPARATUS, AND REINFORCEMENT LEARNING METHOD

(75) Inventors: Norikazu Sugimoto, Kyoto (JP); Yugo Ueda, Wako (JP); Tadaaki Hasegawa, Wako (JP); Soshi Iba, Wako (JP); Koji Akatsuka, Wako (JP)

(73) Assignees: Advanced Telecommunications Research Institute International, Kyoto (JP); Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 13/432,094

(22) Filed: Mar. 28, 2012

(65) Prior Publication Data

US 2012/0253514 A1   Oct. 4, 2012

(30) Foreign Application Priority Data

Mar. 30, 2011   (JP) .................................. 2011-074694

(51) Int. Cl.
 *G06F 19/00* (2011.01)
 *G05B 13/02* (2006.01)
(52) U.S. Cl.
 CPC ........... *G05B 13/0265* (2013.01); *Y10S 901/03* (2013.01)
 USPC ........... 700/245; 700/250; 700/246; 700/249; 700/253; 700/254; 700/260; 700/262; 700/263; 901/3; 318/568.11; 318/568.12; 318/568.2
(58) Field of Classification Search
 USPC ......... 700/245, 250, 246, 249, 253, 254, 260, 700/262, 263; 901/3; 318/568.11, 568.12, 318/568.2
 See application file for complete search history.

(56) References Cited

U.S. PATENT DOCUMENTS

| 7,657,345 B2* | 2/2010 | Endo et al. ..................... 700/249 |
| 8,458,715 B1* | 6/2013 | Khosla et al. ................. 718/104 |
| 2005/0113973 A1* | 5/2005 | Endo et al. ..................... 700/245 |

FOREIGN PATENT DOCUMENTS

JP        2007-066242 A        3/2007

OTHER PUBLICATIONS

Kim et al, Novel framework of robot force control using reinforcement learning, Sep. 2008, IEEE, Robot manipulators, pp. 259-275.*

* cited by examiner

*Primary Examiner* — Khoi Tran
*Assistant Examiner* — Jaime Figueroa
(74) *Attorney, Agent, or Firm* — Cermak Nakajima & McGowan LLP; Tomoko Nakajima

(57) ABSTRACT

It is possible to perform robot motor learning in a quick and stable manner using a reinforcement learning apparatus including: a first-type environment parameter obtaining unit that obtains a value of one or more first-type environment parameters; a control parameter value calculation unit that calculates a value of one or more control parameters maximizing a reward by using the value of the one or more first-type environment parameters; a control parameter value output unit that outputs the value of the one or more control parameters to the control object; a second-type environment parameter obtaining unit that obtains a value of one or more second-type environment parameters; a virtual external force calculation unit that calculates the virtual external force by using the value of the one or more second-type environment parameters; and a virtual external force output unit that outputs the virtual external force to the control object.

7 Claims, 11 Drawing Sheets

REINFORCEMENT LEARNING APPARATUS, CONTROL APPARATUS, AND REINFORCEMENT LEARNING METHOD

This application claims priority under 35 U.S.C. §119 to Japanese Patent Application No. 2011-074694, filed Mar. 30, 2011, which is incorporated by reference.

BACKGROUND OF THE INVENTION

1. Field of the Invention

The present invention relates to a reinforcement learning apparatus and the like that perform robot motor learning.

2. Description of Related Art

Reinforcement learning has been widely used as a robot motor learning technique because it can be implemented even if the dynamics of the control object or the environment are unknown and it autonomously performs learning by simply setting a reward function according to the task (see, for example, JP 2007-66242A).

Conventional techniques, however, have a problem in that the reward function for a complex motion trajectory is often expressed by the sum of various terms, and a trade-off occurring between the terms impedes learning (this is called the "trade-off problem"). For example, the reward function in a two-point reaching movement task is generally composed of a positive reward given at the target point and a negative reward for the energy used. If the ratio of these two elements is not set appropriately, then the speed of learning results is extremely increased or decreased, resulting in undesirable motion trajectories. This trade-off problem becomes more challenging if requirements such as obstacle avoidance, in addition to a reaching movement, are further imposed. Too small a negative reward given upon contact with an obstacle results in collision of the robot arm with the obstacle, and too large a negative reward leads to a learning result in which the robot arm does not move from the starting point. When the reward function has become too complex, the designer has to empirically adjust the balance between the elements, compromising the advantage of reinforcement learning.

SUMMARY OF THE INVENTION

A first aspect of the present invention is directed to a reinforcement learning apparatus including: a reward function storage unit in which a reward function for outputting a reward can be stored; a first-type environment parameter obtaining unit that obtains a value of one or more first-type environment parameters relating to an environment of a moving control object; a control parameter value calculation unit that calculates a value of one or more control parameters maximizing a reward that is output by the reward function by substituting the value of the one or more first-type environment parameters into the reward function; a control parameter value output unit that outputs the value of the one or more control parameters to the control object; a virtual external force function storage unit in which a virtual external force function for outputting a virtual external force can be stored, a second-type environment parameter obtaining unit that obtains a value of one or more second-type environment parameters relating to the virtual external force; a virtual external force calculation unit that calculates the virtual external force by substituting the value of the one or more second-type environment parameters into the virtual external force function; and a virtual external force output unit that outputs the virtual external force to the control object.

With this configuration, the requirements for obstacle avoidance are solved with a virtual external force, and therefore it is possible to perform robot motor learning with a simple reward function in a quick and stable manner.

A second aspect of the present invention is directed to the reinforcement learning apparatus according to the first aspect, including a reinforcement learner and a virtual external force generator that is separated from the reinforcement learner, wherein the reinforcement learner includes: the reward function storage unit, the first-type environment parameter obtaining unit, the control parameter value calculation unit, and the control parameter value output unit, and the virtual external force generator includes: the virtual external force function storage unit, the second-type environment parameter obtaining unit, the virtual external force calculation unit, and the virtual external force output unit.

With this configuration, it is sufficient that relearning is performed for only a portion relating to reaching movement when the movement starting position and the target position are changed, and learning results relating to avoiding movement can be reused unless the position, shape or the like of the obstacle changes.

A third aspect of the present invention is directed to the reinforcement learning apparatus according to the first or second aspect, wherein the value of the one or more control parameters that is output by the control parameter value output unit and the virtual external force that is output by the virtual external force output unit are added together, and given to the control object.

With this configuration, the requirements for obstacle avoidance are solved with a virtual external force, and therefore it is possible to perform robot motor learning with a simple reward function in a quick and stable manner.

A fourth aspect of the present invention is directed to the reinforcement learning apparatus according to any of the first to third aspects, further including a virtual external force approximator, wherein the virtual external force approximator includes: a function approximator storage unit in which can be stored a function approximator including two or more third-type parameters serving as observable third-type parameters that are at least partially different from the second-type environment parameters and outputting a second virtual external force; a state information obtaining unit that observes the control object, and obtains one or more pieces of state information relating to a state of the control object; a second virtual external force calculation unit that calculates the second virtual external force by substituting the state information into the function approximator; a difference information calculation unit that calculates difference information serving as information relating to a difference between the virtual external force that is output by the virtual external force generator and the second virtual external force; and an approximation unit that updates a parameter of the function approximator so as to minimize the difference information.

With this configuration, it is possible to make preparations for controlling a control object with a simplified configuration.

A fifth aspect of the present invention is directed to the reinforcement learning apparatus according to the fourth aspect, further including: a determination unit that determines whether the difference information satisfies a predetermined condition; and a switching unit that switches the virtual external force that is output to the control object from an output of the virtual external force generator to an output of the virtual external force approximator if the determination unit has determined that the difference between the virtual external force that is output by the virtual external force generator and the second virtual external force is small enough to satisfy the predetermined condition.

With this configuration, it is possible to control a control object with a simplified configuration.

A sixth aspect of the present invention is directed to the reinforcement learning apparatus according to any of the first to fifth aspects, wherein a two-point reaching movement task, which is a task of reaching a target point while avoiding an obstacle, is solved.

With this configuration, it is possible to perform robot motor learning for a control object that solves a two-point reaching movement task, using a simple reward function in a quick and stable manner.

A seventh aspect of the present invention is directed to the reinforcement learning apparatus according to any of the fourth to sixth aspects, wherein a coordinate system of the virtual external force is given by relative coordinates corresponding to a specific location of the control object.

With this configuration, it is possible to reuse learning results of the virtual external force approximator even if the position, the posture, or the like of an obstacle has changed.

An eighth aspect of the present invention is directed to the reinforcement learning apparatus according to any of the fourth to seventh aspects, further including a selection unit that obtains, from the one or more pieces of state information obtained by the state information obtaining unit, one or more pieces of state information having a change greater than a threshold, wherein the second virtual external force calculation unit calculates the second virtual external force by substituting, into the function approximator, only the one or more pieces of state information obtained by the selection unit.

With this configuration, it is possible to narrow down the parameters of the function approximator, thus reducing the learning speed.

A ninth aspect of the present invention is directed to a control apparatus that controls a moving control object using the virtual external force approximator according and the reinforcement learner according to any of the fourth to eighth aspects.

With this configuration, it is possible to control a control object with a simplified configuration.

With a reinforcement learning apparatus according to the present invention, it is possible to perform robot motor learning in a quick and stable manner.

DETAILED DESCRIPTION OF THE INVENTION

Figure 1:
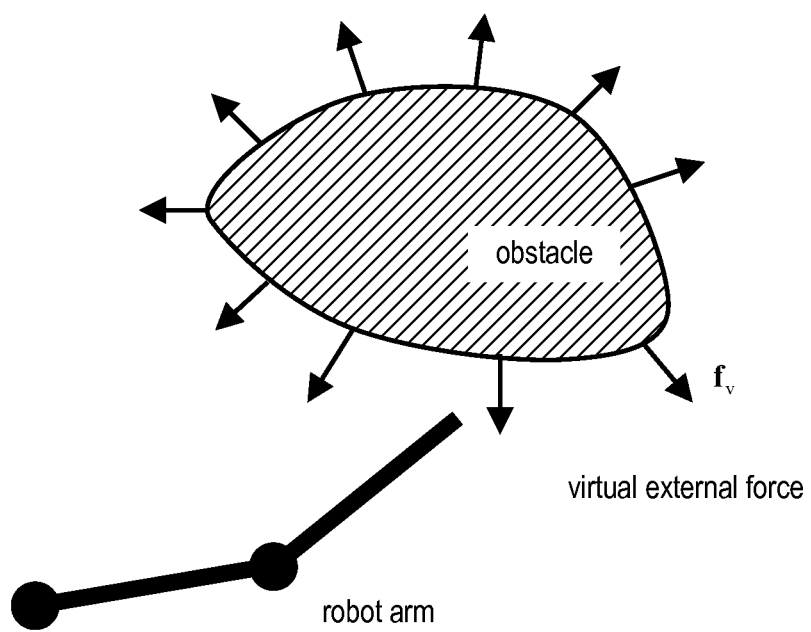
FIG. 1 is a schematic diagram illustrating the operation performed by a reinforcement learning system according to Embodiment 1.

Hereinafter, embodiments of a reinforcement learning system and the like will be described with reference to the accompanying drawings. Note that elements assigned the same reference numerals in the embodiments perform the same operations, and thus such elements may not be repetitively described.

Embodiment 1

In this embodiment, a description will be given of a reinforcement learning apparatus and the like that have the function of generating a virtual external force. In this embodiment, a description will also be given of a reinforcement learning apparatus in which a reinforcement learner and a virtual external force generator that constitute the reinforcement learning apparatus are separated. In this embodiment, a description will also be given of a reinforcement learning apparatus capable of performing automatic switching from the virtual external force generator to the virtual external force approximator. In this embodiment, a description will also be given of a reinforcement learning apparatus that can improve the reusability of the virtual external force generator. Furthermore, in this embodiment, a description will also be given of a reinforcement learning apparatus capable of performing model selection for the function approximator.

FIG. 1 is a schematic diagram illustrating the operation performed by a reinforcement learning system A according to this embodiment. The reinforcement learning system A is a system that performs reinforcement learning mainly for a control object that moves clear of an obstacle. As shown in FIG. 1, in the reinforcement learning system A, for example, generating a virtual external force at the hand tip of a robot arm serving as a control object causes the robot arm to move clear of the obstacle. In the reinforcement learning system A, for example, by generating a virtual external force in a direction perpendicular to the surface of the obstacle and adding the virtual external force to the output of the reinforcement learner, the robot arm achieves reaching movement while avoiding the obstacle.

Figure 2:
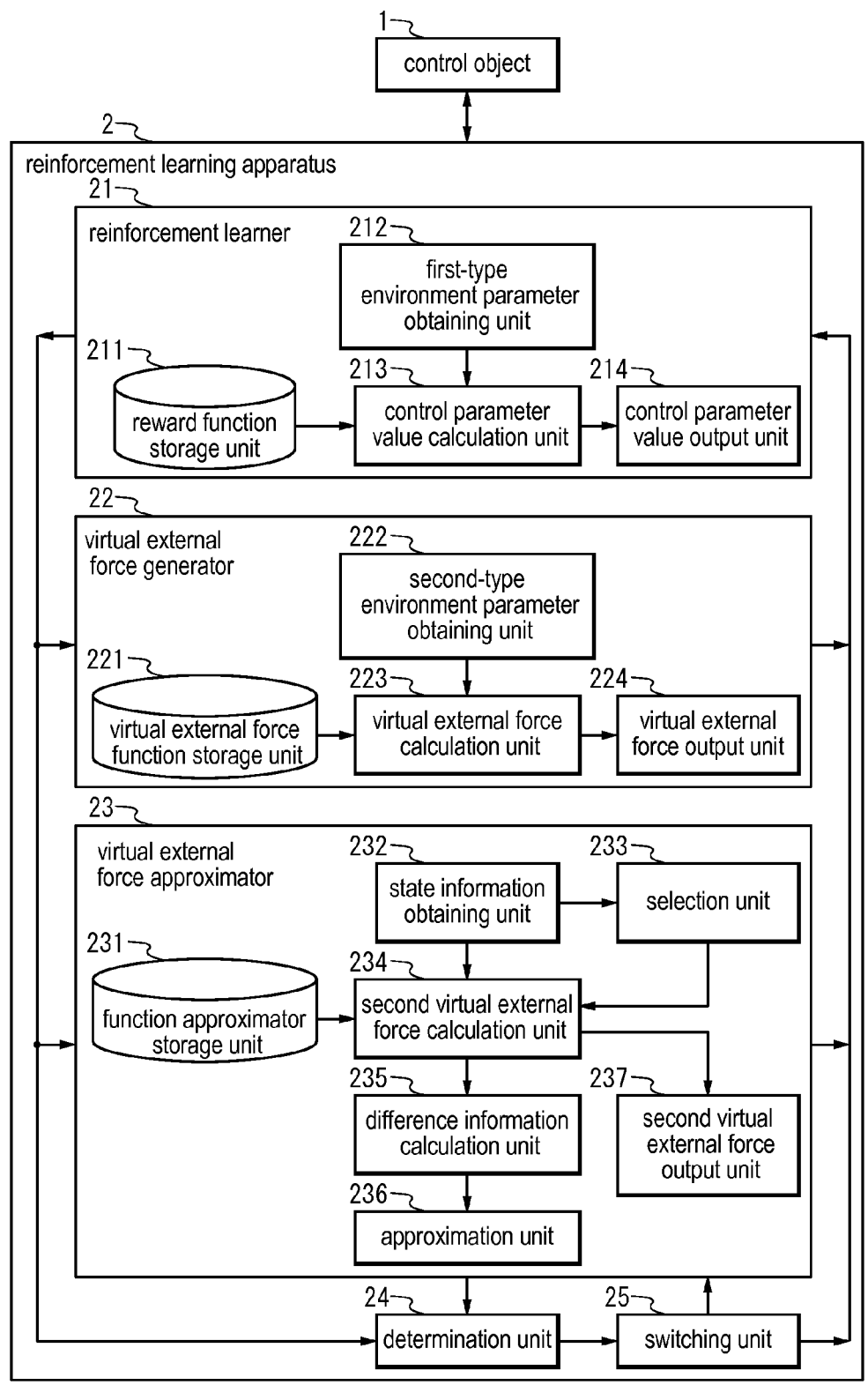
FIG. 2 is a block diagram showing the reinforcement learning system according to Embodiment 1.

FIG. 2 is a block diagram showing the reinforcement learning system A according to this embodiment. The reinforcement learning system A includes a control object 1 and a reinforcement learning apparatus 2. The reinforcement learning apparatus 2 includes a reinforcement learner 21, a virtual external force generator 22, a virtual external force approximator 23, a determination unit 24, and a switching unit 25.

The reinforcement learner 21 includes a reward function storage unit 211, a first-type environment parameter obtaining unit 212, a control parameter value calculation unit 213, and a control parameter value output unit 214.

The virtual external force generator 22 includes a virtual external force function storage unit 221, a second-type environment parameter obtaining unit 222, a virtual external force calculation unit 223, and a virtual external force output unit 224.

The virtual external force approximator 23 includes a function approximator storage unit 231, a state information obtaining unit 232, a selection unit 233, a second virtual external force calculation unit 234, a difference information calculation unit 235, an approximation unit 236, and a second virtual external force output unit 237.

The control object 1 is an object to be controlled, and may be a moving robot, for example. Further, the control object 1 may be, for example, a robot that achieves two-point reaching movement.

The reinforcement learner 21 constituting the reinforcement learning apparatus 2 is a device that can be implemented even if the dynamics of the control object 1 and the environment are unknown, and is capable of autonomously performing learning by simply setting a reward function according to the task.

A reward function can be stored in the reward function storage unit 211 constituting the reinforcement learner 21. The reward function outputs a reward. Generally, the reward function is expressed by the sum of two or more terms. In general, the reward function in a two-point reaching movement task is composed of the sum of a positive reward corresponding to the distance to the target point and a negative reward corresponding to the magnitude of the output, for example. More specifically, the reward function is a function for which a positive reward corresponding to the distance to the target point is given by a Gaussian distribution and a negative reward corresponding to the magnitude of the output is given by a quadratic form, for example.

For example, the reward function r(t) is given by Expression 1 below. Note that "t" is time.

$$r(t) = \exp\left[-\frac{1}{2\sigma^2}\|p(t) - p_{goal}\|^2\right] - \frac{1}{2}u(t)^T R u(t) \quad \text{[Expression 1]}$$

In Expression 1, p(t) is the hand-tip position, $p_{goal}$ is the target position for the hand tip, and σ is a parameter that defines the range in which the positive reward is given. u(t) is the action at the time t. An action is information that determines movement of the control object. The action u is, for example, a vector in which control powers given to joints of the robot are arranged. Further, R is a matrix, which is a parameter that defines the magnitude of the negative reward with respect to a control power. In general, a positive definite matrix is used. When R is large, slow movement toward the goal with a small control power is learned. Conversely, when R is small, quick movement toward the goal with a large control power is learned. Note that the action u is one or more control parameters described below. The one or more control parameters are calculated by the control parameter value calculation unit 213.

The agent (corresponding to the reinforcement learning apparatus 2) that performs reinforcement learning learns an action rule that maximizes the reward, for example, by searching a state space by trial and error. However, there are various methods for determining what variables are used for the state space. In robot arm control, it is common to use vectors composed of the angles and the angular velocities of joints for the state space. On the other hand, in the case of a two-point reaching movement with an obstacle, the learning efficiency is dramatically increased by including, in the state space, the positions and the speeds of the hand tip in addition to the angles and the angular velocities of joints. The reason for this seems to be that the reward function and the virtual external force depend on the hand-tip coordinates and therefore the information relating to the hand-tip coordinates plays an important role.

The first-type environment parameter obtaining unit 212 obtains a value of one or more first-type environment parameters relating to the environment of the control object 1. The first-type environment parameter is, for example, the distance to the target point, the current location, the angle and the angular velocity of joints of the robot arm, the position and the speed of the hand tip, and the like. The first-type environment parameter is a parameter corresponding to a value that can be substituted into the reward function. The first-type environment parameter obtaining unit 212 may be realized by a high-resolution stereo camera, range sensor, or the like, and a CPU or the like.

The control parameter value calculation unit 213 calculates the value of one or more control parameters maximizing the reward that is output by the reward function by substituting the one or more first-type environment parameters into the reward function. The control parameter is determined depending on the structure of the control object and the type of the learning algorithm. Note that this processing is reinforcement learning. Examples of the reinforcement learning algorithms include Q-learning, SARSA, and a policy gradient method, and various algorithms can be implemented according to the situation. Also, for reinforcement learning in continuous time and reinforcement learning in continuous space, it is necessary to use a function approximator for expressing a value function and a policy, and the function approximator can be selected from various function approximators such as an NGNet, an RBF, a neural net, and a CMAC. The reinforcement learning algorithms are known in the art, and therefore the detailed description thereof has been omitted.

The control parameter value output unit 214 outputs the value of the one or more control parameters calculated by the control parameter value calculation unit 213 to the control object 1. Generally, the output as mentioned herein refers to an output for being combined with a virtual external force or a second virtual external force. Then, the combined force (generally, a vector) is given to the control object 1.

Figure 3:
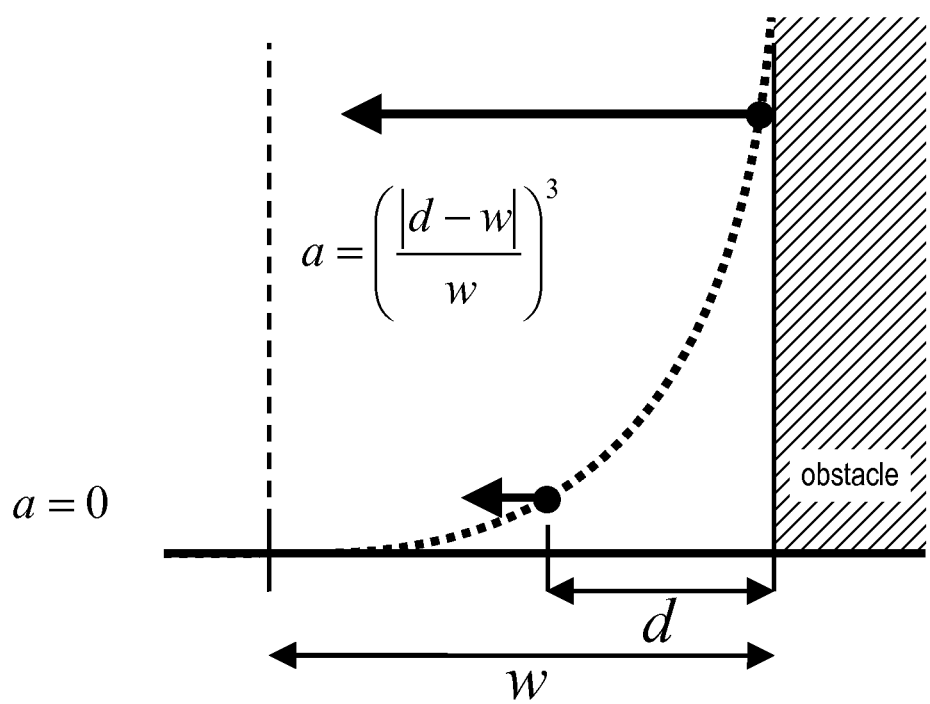
FIG. 3 is a graph showing the relationship between the distance from an obstacle and a virtual external force.

The virtual external force generator 22 generates a virtual external force, and outputs the virtual external force to the control object 1. The virtual external force generator 22 senses the surface of an obstacle using a high-resolution stereo camera, range sensor, or the like and causes a virtual external force $f_v$ acting to avoid the obstacle to be generated at the hand tip. Note that $f_v$ is a virtual external force represented by a hand-tip coordinate system, and will be eventually converted into a virtual external force represented by a joint angle coordinate system. Although the virtual external force $f_v$ needs to have a large value in order to reliably avoid the obstacle, sudden generation of a large force is not preferable in terms of safety and the stability of learning, for example. Therefore, it is preferable that the virtual external force $f_v$ is smoothly changed according to the distance from the obstacle. That is, for example, it is preferable that the virtual external force generator 22 causes the virtual external force to be generated so as to maintain a relationship between the virtual external force and the distance from the obstacle as shown in FIG. 3. FIG. 3 shows a case where the magnitude of the virtual external force changes in proportion to the cube of the distance from the obstacle. The variable "a" indicated by the dotted line determines the magnitude of the virtual external force. "d" represents the distance from the obstacle. The variable "a" increases in proportion to the cube of the distance d in the region closer than "w", and the variable "a" is zero in the region farther than "w". It is preferable that the change in the variable "a" is continuous in the vicinity of the distance w. Further, the slope of increase of the variable "a" can be roughly determined from a physical parameter.

Then, the virtual external force $f_v$ applied to the hand tip can be expressed as Expression 2 using the variable "a".

$$f_v(t)=a(t)h \qquad \text{[Expression 2]}$$

Here, "h" is a unit vector perpendicular to the surface of the obstacle, measured using a camera, a range sensor, or the like.

Also, the virtual external force $f_v$ can be converted from the hand-tip coordinate system into the joint coordinate system using a Jacobian matrix J(t). The virtual external force $u_v$ in the joint coordinate system can be calculated using Expression 3.

$$u_v(t)=J(t)^{-1}f_v(t) \qquad \text{[Expression 3]}$$

Note that the inverse matrix of the Jacobian matrix cannot be calculated when the degree of freedom of the hand tip and the degree of freedom of the joints are different, and therefore such a case is handled using a pseudo inverse matrix or the like. In previous studies, it has been common to use $(J^T J)^{-1} J^T$ for the pseudo inverse matrix of a Jacobian matrix in which the degree of freedom of the hand tip is greater than the degree of freedom of the joints, and $J^T (J J^T)^{-1}$ for the pseudo inverse matrix of a Jacobian matrix in which the degree of freedom of the joints is greater than the degree of freedom of the hand tip.

A virtual external force function for outputting a virtual external force can be stored in the virtual external force function storage unit 221 constituting the virtual external force generator 22. Generally, the virtual external force function refers to a function having the distance from the obstacle as a parameter. Generally, the virtual external force function is a decreasing function having the distance from the obstacle as a parameter. For example, the virtual external force function is a function in which the magnitude of the virtual external force decreases in proportion to the cube of the distance from the obstacle. It is preferable that the virtual external force function is information represented by Expression 2, Expression 3, and FIG. 3.

The second-type environment parameter obtaining unit 222 obtains a value of one or more second-type environment parameters relating to the virtual external force. Note that the second-type environment parameter is, for example, the distance from the obstacle. The second-type environment parameter obtaining unit 222 can be realized by a high-resolution stereo camera, range sensor, or the like.

The virtual external force calculation unit 223 calculates the virtual external force by substituting the one or more second-type environment parameters into the virtual external force function of the virtual external force function storage unit 221.

The virtual external force output unit 224 outputs the virtual external force calculated by the virtual external force calculation unit 223 to the control object 1. Generally, the output as mentioned herein refers to an output for being combined with the value of the one or more control parameters. Then, the combined force (generally, a vector) is given to the control object 1.

The virtual external force approximator 23 simulates the output $u_v$ of the virtual external force generator 22. The virtual external force approximator 23 observes what virtual external force is generated in what state, and learns the approximate output $\hat{u}_v$. Then, after a sufficiently good approximation accuracy has been achieved, a virtual external force for avoiding an obstacle can be generated by using the virtual external force approximator 23 in place of the virtual external force generator 22 without the use of expensive equipment. Also, the virtual external force approximator 23 calculates the approximate output $\hat{u}_v$ using Expression 4 below. Note that the approximate output $\hat{u}_v$ is also referred to as the "second virtual external force".

$$\hat{u}_v(\theta,p,t)=\phi(\theta,p,t) \qquad \text{[Expression 4]}$$

In Expression 4, $\phi$ is a function approximator described below. In Expression 4, $\theta$ is a vector composed of the angles of joints, p is a position vector of the hand tip, and t is time.

A function approximator including two or more third-type parameters and outputting a second virtual external force can be stored in the function approximator storage unit 231. Here, the third-type parameter is an observable third-type parameter that is at least partially different from the second-type environment parameter. Further, the third-type parameter is the angle vector of the joints, the position vector of the hand tip, or time. Generally, the third-type parameter is, for example, a parameter whose value can be obtained from the control object 1. It is preferable that the third-type parameter is a parameter that can be observed without the use of special hardware such as a stereo camera or a range sensor. Further, the third-type parameter is a parameter into which state information described below is substituted. The function approximator is a function. Further, the function approximator can be selected from various function approximators such as an NGNet, an RBF, a neural net, and a CMAC.

The state information obtaining unit 232 observes the control object 1, and obtains one or more pieces of state information relating to the state of the control object 1. The state information is the angle vector of the joints, the position vector of the hand tip, or the like.

The selection unit 233 obtains, from the one or more pieces of state information obtained by the state information obtaining unit 232, one or more pieces of state information having a change greater than a threshold. Generally, the selection unit 233 obtains one or more pieces of state information serving as information for controlling a joint that is important for obstacle avoidance.

The second virtual external force calculation unit 234 calculates the second virtual external force by substituting the state information into the function approximator. Also, the second virtual external force calculation unit 234 calculates the second virtual external force $\hat{u}_v$ using, for example, Expression 4. Note that it is preferable that the second virtual external force calculation unit 234 calculates the second virtual external force by substituting only the one or more pieces of state information obtained by the selection unit 233 into the function approximator.

The difference information calculation unit 235 calculates difference information serving as information relating to the difference between the virtual external force that is output by the virtual external force generator 22 and the second virtual external force. The difference information may be the absolute value of a difference, or may be the logarithmic value of the absolute value of a difference, or the like. The difference information calculation unit 235 calculates difference information "e" using, for example, Expression 5. In Expression 5, the difference information is the square of the norm of the difference between the virtual external force and the second virtual external force.

$$e=\|u_v-\hat{u}_v\|^2 \qquad \text{[Expression 5]}$$

The approximation unit 236 updates the parameter of the function approximator so as to minimize the difference information "e". More specifically, the approximation unit 236 differentiates partially the difference information "e" with the parameter of the function approximator, and updates the parameter of the function approximator in a direction in which the gradient descends. By repeating this update, the approximation unit 236 can acquire the parameter of the function approximator that minimizes the difference information "e".

The second virtual external force output unit 237 outputs the second virtual external force $\hat{u}_v$ calculated by the second virtual external force calculation unit 234 to the control object 1. Generally, the output as mentioned herein refers to an output for being combined with the value of the one or more control parameters. Then, the combined force (generally, a vector) is given to the control object 1.

The determination unit 24 determines whether the difference information "e" satisfies a predetermined condition. Alternatively, the determination unit 24 may determine whether a history of the difference information satisfies a predetermined condition. Generally, the predetermined condition is, for example, that the difference information "e" is smaller than the threshold (including the difference information "e" smaller than or equal to the threshold), or that the difference information "e" is converging.

If the determination unit 24 has determined that the difference between the virtual external force that is output by the virtual external force generator 22 and the second virtual external force is small enough to satisfy the predetermined condition, the switching unit 25 switches the virtual external force that is output to the control object 1, from the output of the virtual external force generator 22 to the output of the virtual external force approximator 23. Note that if the determination unit 24 has determined that the virtual external force approximator 23 has sufficiently simulated the role of the virtual external force generator 22, the switching unit 25 switches the above-described virtual external force from the output of the virtual external force generator 22 to the output of the virtual external force generator 23, and the approximation unit 236 ends updating of the parameter.

The reward function storage unit 211, the virtual external force function storage unit 221, and the function approximator storage unit 231 are preferably non-volatile recording media, but they may also be realized by volatile recording media. There is no particular limitation with respect to the process in which the reward function and the like are stored in the reward function storage unit 211 and the like. For example, the reward function and the like may be stored via a recording medium in the reward function storage unit 211 and the like, or the reward function and the like transmitted via a communications line or the like may be stored in the reward function storage unit 211 and the like. Alternatively, the reward function and the like that have been input via an input device may be stored in the reward function storage unit 211 and the like.

The control parameter value calculation unit 213, the control parameter value output unit 214, the second-type environment parameter obtaining unit 222, the virtual external force calculation unit 223, the virtual external force output unit 224, the state information obtaining unit 232, the selection unit 233, the second virtual external force calculation unit 234, the difference information calculation unit 235, and the approximation unit 236 can be generally realized by an MPU, memory or the like. The processing procedure of the control parameter value calculation unit 213 and the like is generally realized by software, and the software for this is recorded in a recording medium such as a ROM. Note that the processing procedure also may be realized by hardware (dedicated circuitry).

Figure 4:
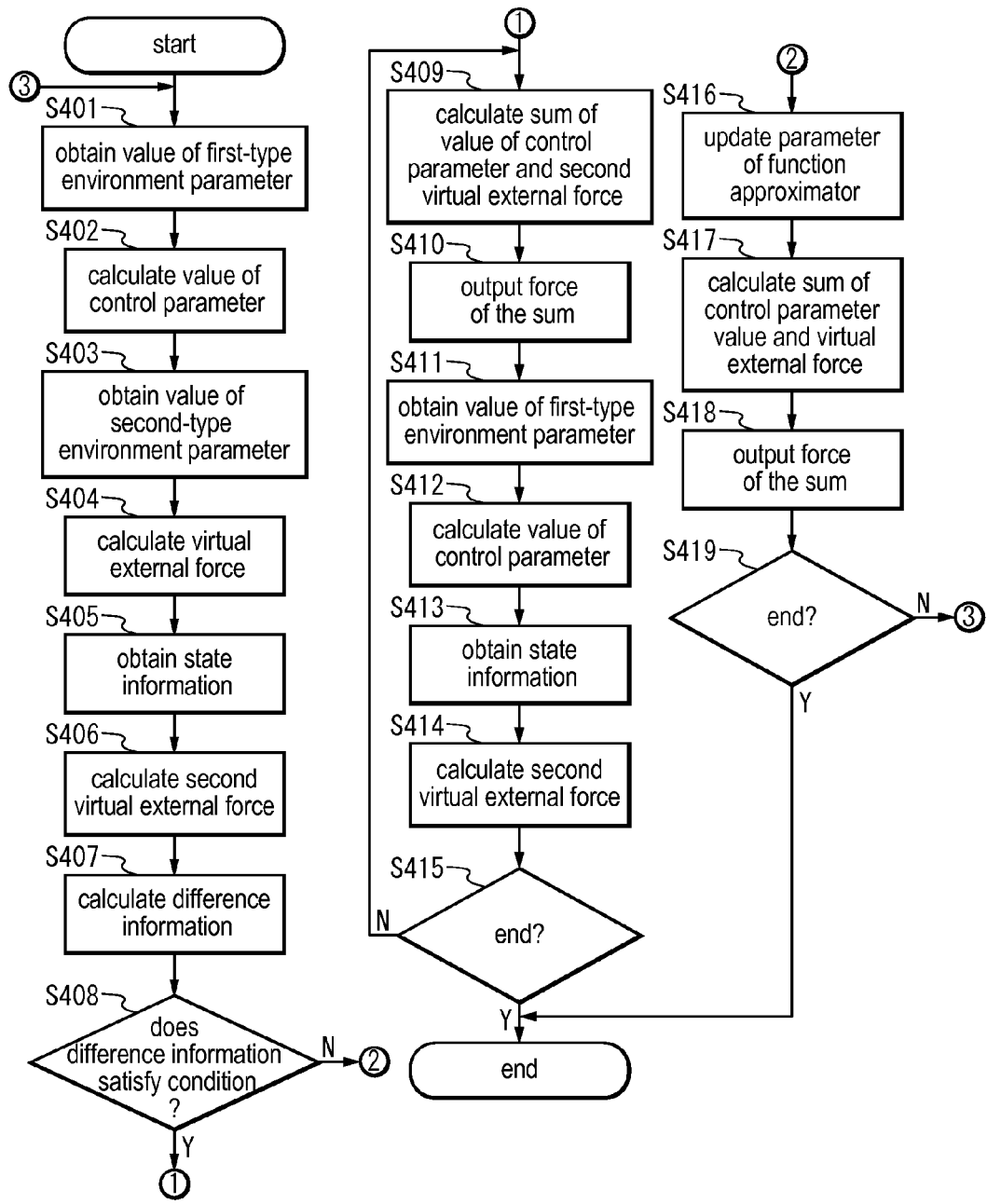
FIG. 4 is a flowchart illustrating the operation of the reinforcement learning system according to Embodiment 1.

Next, the operation of the reinforcement learning system A will be described with reference to the flowchart in FIG. 4.

(Step S401) The first-type environment parameter obtaining unit 212 of the reinforcement learner 21 obtains a value of the one or more first-type environment parameters of the control object 1.

(Step S402) The control parameter value calculation unit 213 reads the reward function from the reward function storage unit 211. Then, the control parameter value calculation unit 213 calculates the value of one or more control parameters maximizing the reward that is output by the reward function by substituting, into the reward function, the value of the one or more first-type environment parameters obtained in step S401. As described above, there is no particular limitation with respect to the algorithm used in such a case, and it is possible to use Q-learning, SARSA, a policy gradient method, or the like.

(Step S403) The second-type environment parameter obtaining unit 222 of the virtual external force generator 22 obtains a value of the one or more second-type environment parameters.

(Step S404) The virtual external force calculation unit 223 reads the virtual external force function from the virtual external force function storage unit 221. Then, the virtual external force calculation unit 223 calculates the virtual external force by substituting, into that virtual external force function, the value of the one or more second-type environment parameters obtained in step S403.

(Step S405) The state information obtaining unit 232 constituting the virtual external force approximator 23 observes the control object 1, and obtains one or more pieces of state information.

(Step S406) The second virtual external force calculation unit 234 reads the function approximator from the function approximator storage unit 231. Next, the second virtual external force calculation unit 234 calculates the second virtual external force by substituting, into the function approximator, the one or more pieces of state information obtained in step S405. Note that before calculation of the second virtual external force, the selection unit 233 may select, from the one or more pieces of state information obtained by the state information obtaining unit 232, one or more pieces of state information having a change greater than the threshold, and the second virtual external force calculation unit 234 may calculate the second virtual external force using only the selected state information.

(Step S407) The difference information calculation unit 235 calculates the difference information between the virtual external force calculated in step S404 and the second virtual external force calculated in step S406.

(Step S408) The determination unit 24 determines whether the difference information calculated in step S407 is small enough to satisfy the predetermined condition. Note that the determination unit 24 may determine whether the predetermined condition is satisfied using two or more pieces of difference information that are continuous in time (a history of the difference information). If the predetermined condition is satisfied, the procedure moves to step S409. If the predetermined condition is not met, the procedure moves to step S416.

(Step S409) The reinforcement learning apparatus 2 calculates the sum of the value of the one or more control parameters and the second virtual external force. Note that it may be considered that this calculation is performed by a synthesizing unit (not shown) of the reinforcement learning apparatus 2.

(Step S410) The reinforcement learning apparatus 2 outputs the force vector of the sum calculated in step S409 to the control object. Note that it may be considered that this output is also performed by the synthesizing unit (not shown) of the reinforcement learning apparatus 2.

(Step S411) The first-type environment parameter obtaining unit 212 obtains a value of one or more first-type environment parameters of the control object 1.

(Step S412) The control parameter value calculation unit 213 calculates the value of one or more control parameters maximizing the reward that is output by the reward function by substituting, into the reward function, the value of the one or more first-type environment parameters obtained in step S411.

(Step S413) The state information obtaining unit 232 observes the control object 1, and obtains one or more pieces of state information.

(Step S414) The second virtual external force calculation unit 234 calculates the second virtual external force by substituting, into the function approximator, the one or more pieces of state information obtained in step S413.

(Step S415) The reinforcement learning apparatus 2 determines whether the processing is to be ended. If it is determined that the processing is to be ended, the processing ends. If it is determined that the processing is not to be ended, the procedure returns to step S409. Note that it is determined that the processing is to be ended when the goal has been achieved. Note that this determination may also be performed by the determination unit 24.

(Step S416) The approximation unit 236 updates the parameter of the function approximator so as to minimize the difference information obtained in step S407.

(Step S417) The reinforcement learning apparatus 2 calculates the sum of the value of the one or more control parameters and the virtual external force. Note that it may be considered that this calculation is performed by the synthesizing unit (not shown) of the reinforcement learning apparatus 2.

(Step S418) The reinforcement learning apparatus 2 outputs the force vector of the sum calculated in step S417 to the control object. Note that it may be considered that this output is also performed by the synthesizing unit (not shown) of the reinforcement learning apparatus 2.

(Step S419) The reinforcement learning apparatus 2 determines whether the processing is to be ended. If it is determined that the processing is to be ended, the processing ends. If it is determined that the processing is not to be ended, the procedure returns to step S401. Note that it is determined that the processing is to be ended if the goal has been achieved. Note that this determination may also be performed by the determination unit 24.

Figure 5:
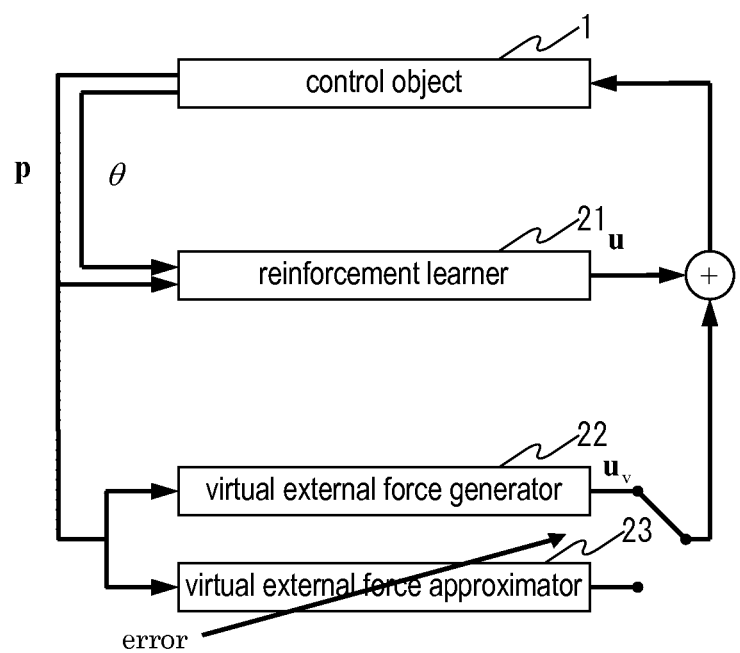
FIG. 5 is a schematic diagram showing a reinforcement learner, a virtual external force generator, a virtual external force approximator, and a control object according to Embodiment 1.

The following describes an outline of the operation of the reinforcement learning system A according to this embodiment. The operation as mentioned herein refers to an operation of performing a two-point reaching movement clear of an obstacle by generating a virtual external force at the hand tip of a robot. By generating a virtual external force in a direction perpendicular to the surface of the obstacle (see FIG. 1) and adding the virtual external force to the output of the reinforcement learner, the reinforcement learning system A achieves the reaching movement while avoiding the obstacle. FIG. 5 shows a schematic diagram of the reinforcement learner 21, the virtual external force generator 22, and the virtual external force approximator 23 and the control object 1 that constitute the reinforcement learning system A in this case.

In FIG. 5, the reinforcement learner 21 outputs the action u (corresponding to one or more control parameters) for performing the two-point reaching movement, in accordance with the reward function given (for example, Expression 1). The action u is, for example, a vector in which control powers given to joints of the robot are arranged. In FIG. 5, p is information relating to the hand-tip position of the control object 1. θ is a vector of the angles of joints of the control object 1.

The virtual external force generator 22 recognizes the obstacle using a high-resolution stereo camera, range sensor, or the like, and calculates a virtual external force $u_v$ that causes the obstacle and the hand tip to repel each other. The sum of the action u and the virtual external force $u_v$ is given to each joint, and thereby the reinforcement learning apparatus 2 can achieve the two-point reaching movement while avoiding the obstacle.

Figure 6:
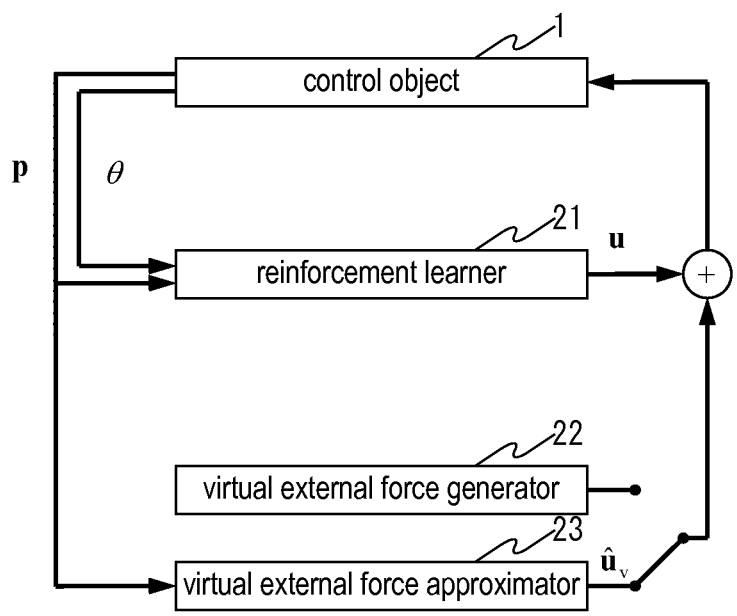
FIG. 6 is a schematic diagram showing the reinforcement learner, the virtual external force generator, the virtual external force approximator, and the control object according to Embodiment 1.

The virtual external force approximator 23 simulates behaviors of the virtual external force generator 22, and learns what virtual external force is output at what time and in what state. After the learning of the virtual external force approximator 23 has sufficiently converged, the task can be achieved without the use of the virtual external force generator 22 by adding the output $\hat{u}_v$ of the virtual external force approximator 23, instead of the output of the virtual external force generator 22, to the action u of the reinforcement learner 21 (see FIG. 6).

Experimental Results

Figure 7:
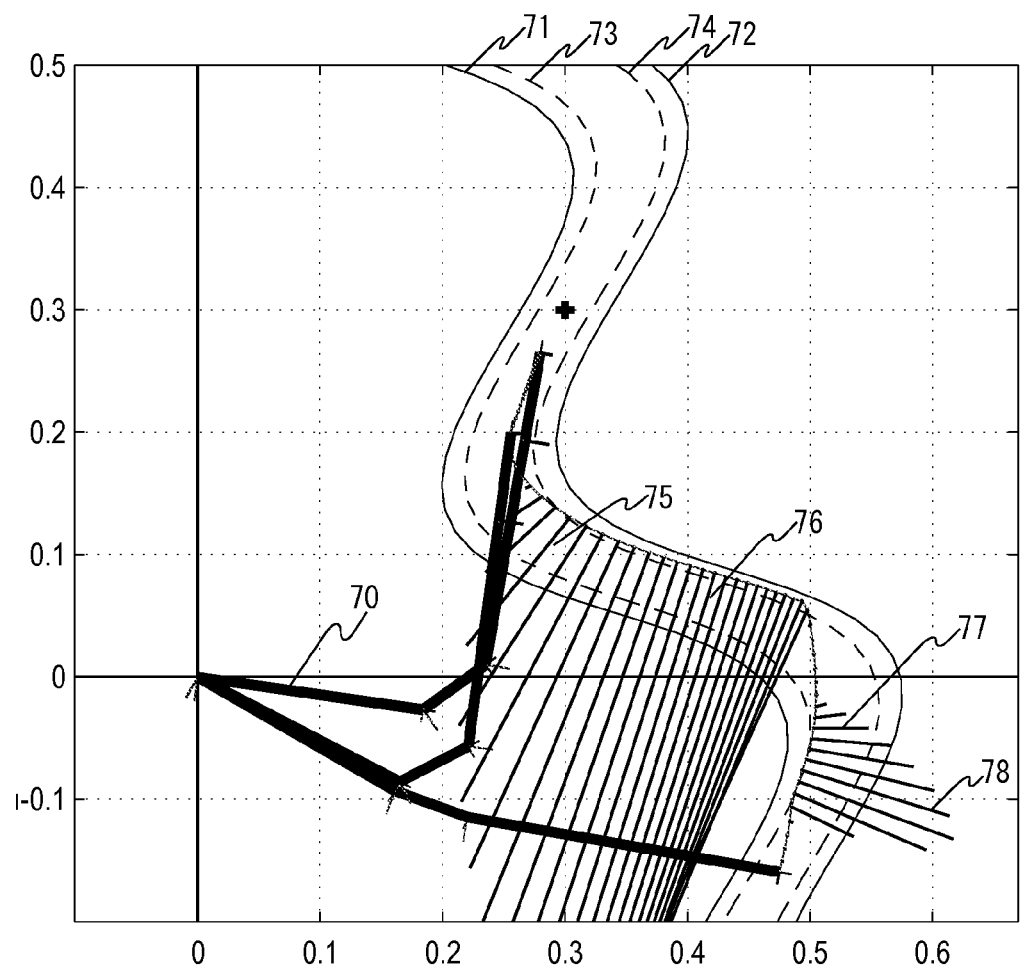
FIG. 7 is a graph showing experimental results in Embodiment 1.

The following describes experimental results. In this experiment, the control object 1 is a robot arm having 7 degrees of freedom. In this experiment, a two-point reaching movement task with an obstacle was performed using a robot arm simulator having 7 degrees of freedom. The results are shown in FIG. 7. In FIG. 7, the thick solid lines (e.g., 70) indicate the robot arm. In FIG. 7, the coordinates on the vertical axis and the horizontal axis indicate the positions of the robot arm.

The agent (the reinforcement learning apparatus 2) learns an action rule of causing the hand tip of the robot arm (the control object 1) to reach to the target point (0.3, 0.3) from the initial position (0.48, −0.16) while avoiding an obstacle. The solid lines 71 and 72 indicate the surface of the obstacle. When the hand tip has approached to the solid lines 71 and 72 beyond the dotted lines 73 and 74, the variable "a" exceeds 0 and the virtual external force $f_v$ is generated. The generated virtual external force $f_v$ in the hand-tip coordinate system is represented by the solid lines (75, 76, 77, 78, etc.) at the lower portion in FIG. 7.

Figure 8:
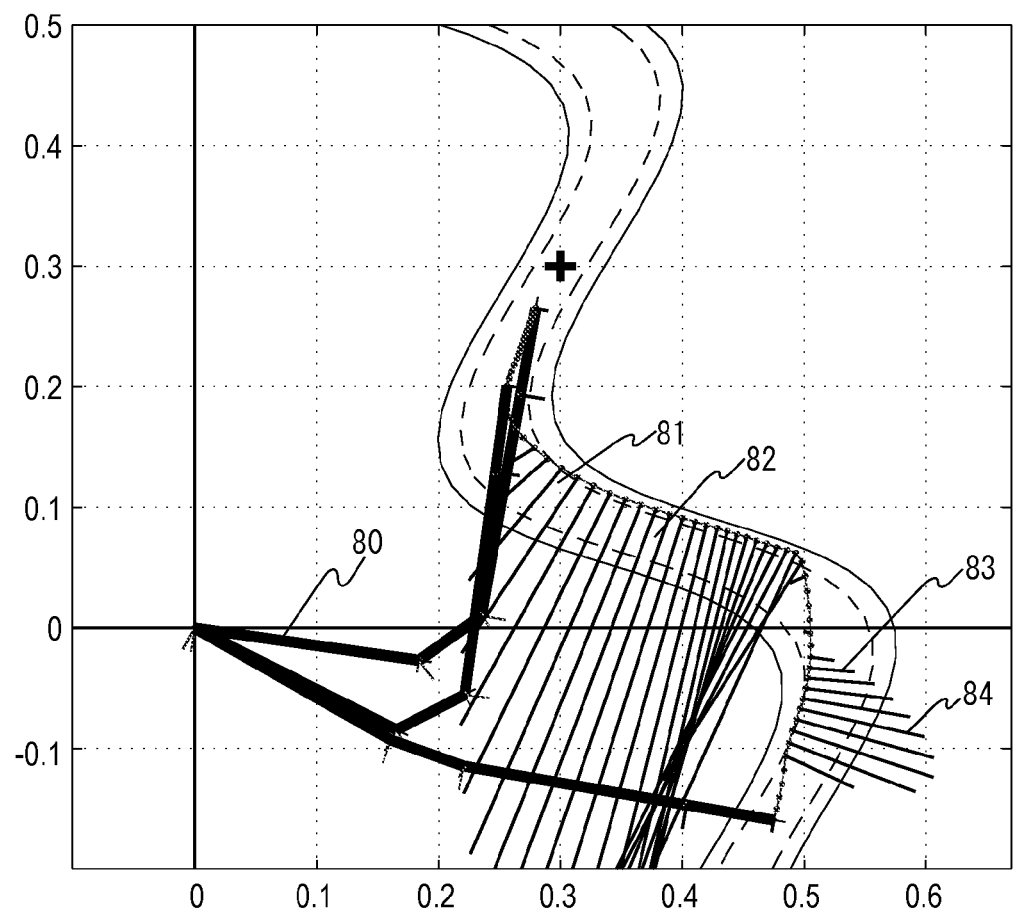
FIG. 8 is a graph showing experimental results in Embodiment 1.

FIG. 8 shows results obtained in a case where the virtual external force generator 22 was not used after the learning of the virtual external force approximator 23 had sufficiently proceeded. The solid lines (81, 82, 83, 84, etc.) indicate the results obtained by converting the virtual external force $\hat{u}_v(t)$ approximated in the joint coordinate system into a hand-tip coordinate system using the Jacobian matrix J(t). Note that the approximate output of the virtual external force in the hand-tip coordinate system shown in FIG. 8 is not necessarily required when executing the algorithm, and was calculated in order to confirm the results of the approximation for the sake of convenience. It can be seen from these results that the robot arm was able to reach the target point while avoiding the obstacle without the virtual external force generator 22. In FIG. 8, the thick solid lines (80, etc.) indicate the robot arm.

As described thus far, according to this embodiment, the requirements for obstacle avoidance are solved with a virtual external force, and therefore it is possible to perform robot motor learning with a simple reward function in a quick and stable manner.

According to this embodiment, due to the separation of the reinforcement learner 21 and the virtual external force generator 22, it is sufficient that relearning is performed for only a portion (the reinforcement learner 21) relating to the reaching movement when the movement starting position and the target position are changed, and approximation results of the virtual external force approximator 23 can be reused unless the position, shape or the like of the obstacle changes.

According to this embodiment, it is possible, with the virtual external force approximator 23, to make preparations for controlling a control object with a simplified configuration.

According to this embodiment, by performing automatic switching from the virtual external force generator 22 to the virtual external force approximator 23, it is possible to control a control object with a simplified configuration.

According to this embodiment, it is possible to perform robot motor learning, in particular, for a control object that solves a two-point reaching movement task, using a simple reward function in a quick and stable manner.

According to this embodiment, since the coordinate system of the virtual external force is given by relative coordinates for a specific location of the control object 1, it is possible to reuse learning results of the virtual external force approximator even if the position, the posture or the like of the obstacle has changed.

Furthermore, according to this embodiment, it is possible, with the selection unit 233, to narrow down the parameters of the function approximator, thus reducing the learning speed. More specifically, by examining the inverse matrix of the Jacobian matrix in Expression 3, it is possible to know the degree of contribution of each joint to the approximation of the virtual external force in the hand-tip coordinate system. Since the Jacobian matrix can be easily determined from the design drawing or the like of a robot, calculation of the Jacobian matrix prior to experiments enables the parameters of the function approximator to be efficiently arranged. By narrowing down the number of parameters in this way, it is possible to reduce the learning time.

Note that, according to this embodiment, a control apparatus that controls a moving control object can be constructed using the virtual external force approximator 23 and the reinforcement learner 21. It is possible, with this control apparatus, to control a control object with a simplified configuration.

According to this embodiment, the virtual external force approximator 23, the determination unit 24, and the switching unit 25 do not need to exist in the reinforcement learning apparatus 2.

Furthermore, according to this embodiment, the selection unit 233 does not need to exist in the virtual external force approximator 23.

Embodiment 2

In this embodiment, a description will be given of a reinforcement learning apparatus and the like in which the reinforcement learner and the virtual external force generator are not separated.

Figure 9:
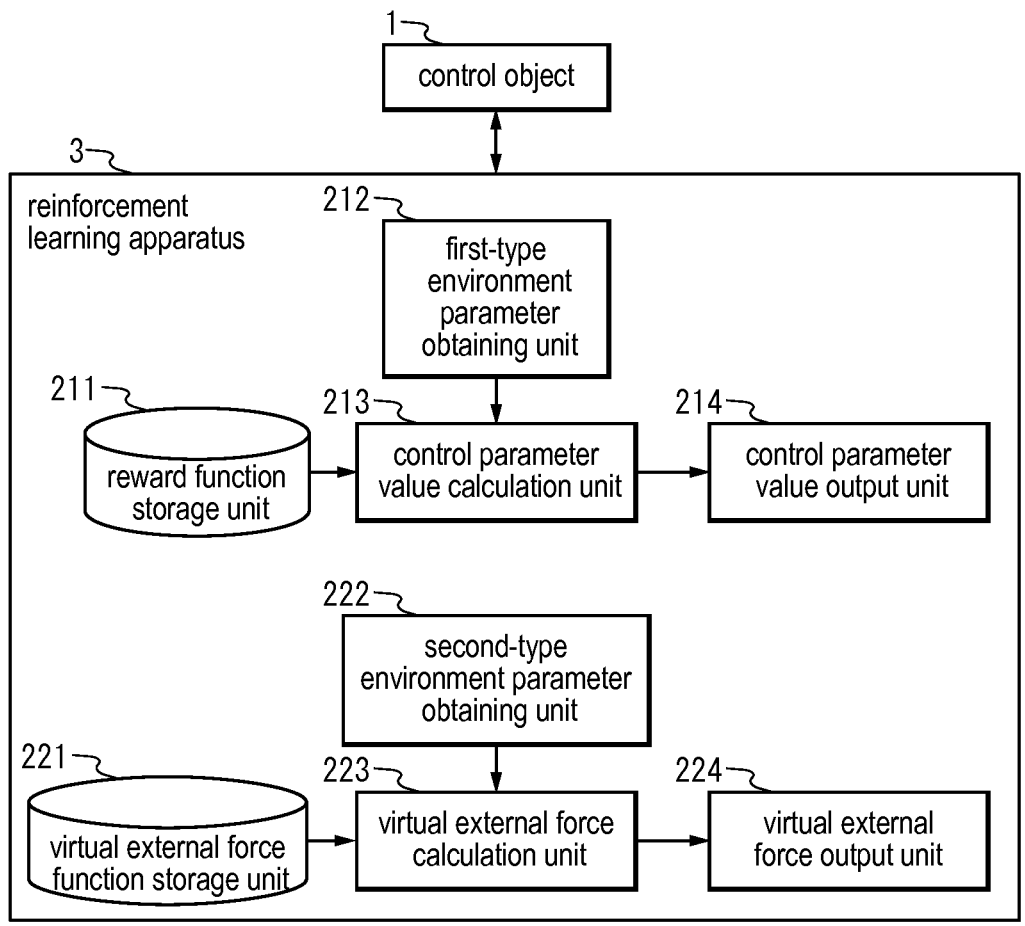
FIG. 9 is a block diagram showing a reinforcement learning system according to Embodiment 2.

FIG. 9 is a block diagram showing a reinforcement learning system B according to this embodiment.

The reinforcement learning system B includes the control object 1 and a reinforcement learning apparatus 3. The difference between the reinforcement learning apparatus 3 and the reinforcement learning apparatus 2 lies in whether the reinforcement learner and the virtual external force generator are separated or not. In the reinforcement learning apparatus 3, the reinforcement learner and the virtual external force generator are not separated.

The reinforcement learning apparatus 3 includes the reward function storage unit 211, the first-type environment parameter obtaining unit 212, the control parameter value calculation unit 213, the control parameter value output unit 214, the virtual external force function storage unit 221, the second-type environment parameter obtaining unit 222, the virtual external force calculation unit 223, and the virtual external force output unit 224.

Note that the reinforcement learning apparatus 3 and the reinforcement learning apparatus 2 operate in the same manner, and therefore the description of the operation of the reinforcement learning apparatus 3 has been omitted.

As described thus far, according to this embodiment, the requirements for obstacle avoidance are solved with a virtual external force, and therefore it is possible to perform robot motor learning with a simple reward function in a quick and stable manner.

According to this embodiment, it is possible to perform robot motor learning, in particular, for the control object 1 that solves a two-point reaching movement task, using a simple reward function in a quick and stable manner.

Figure 10:
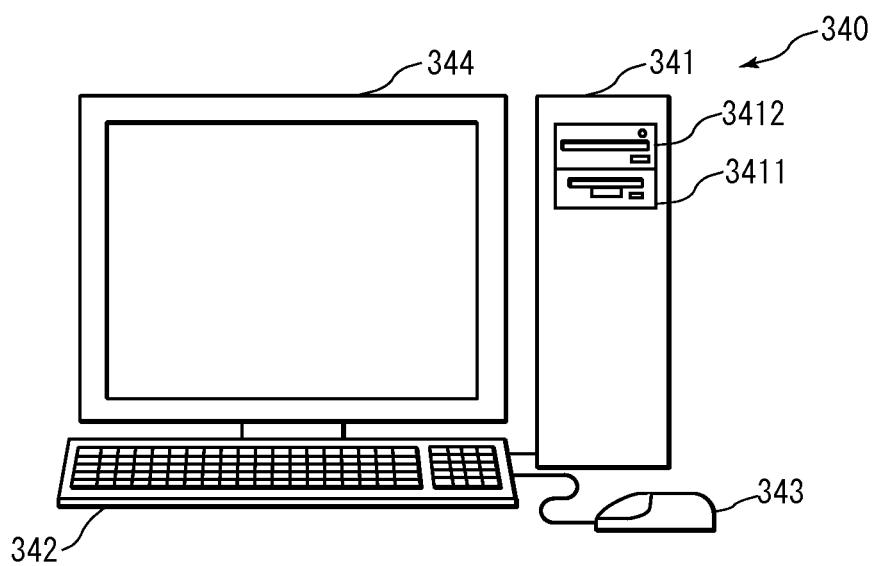
FIG. 10 illustrates an overview of a computer system according to the above-stated embodiments.
Figure 11:
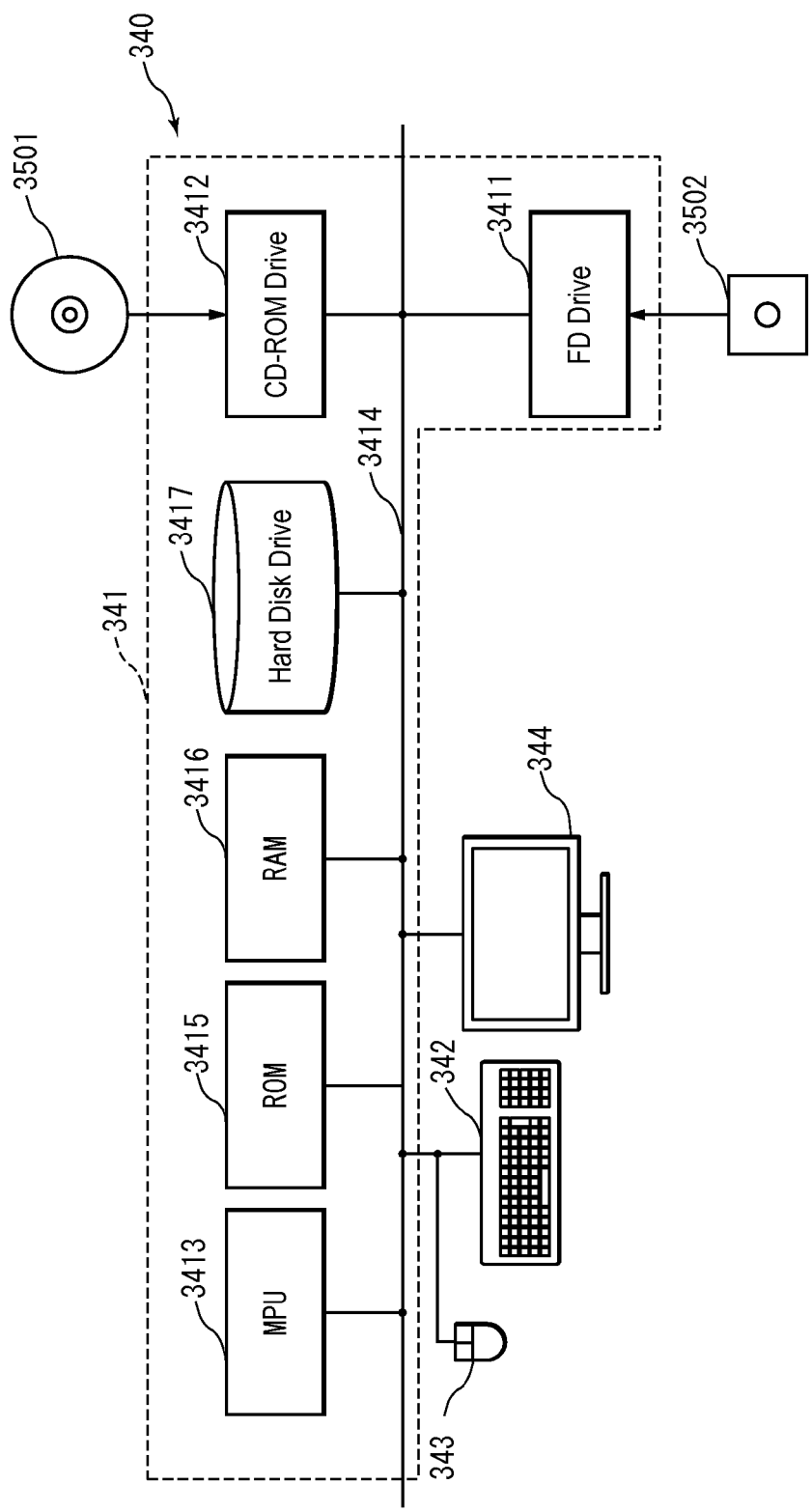
FIG. 11 is a block diagram showing the computer system according to the above-stated embodiments.

FIG. 10 shows an external view of a computer that realizes the reinforcement learning apparatus and the like according to the forgoing embodiments by executing the program described in the present specification. The foregoing embodiments may be realized using computer hardware and a computer program executed thereon. FIG. 10 is a schematic diagram of a computer system 340. FIG. 11 is a block diagram of the computer system 340.

In FIG. 10, the computer system 340 includes a computer 341 including an FD drive and a CD-ROM drive, a keyboard 342, a mouse 343, and a monitor 344.

In FIG. 11, the computer 341 includes not only an FD drive 3411 and a CD-ROM drive 3412, but also a RAM 3416 that is connected to an MPU 3413, a bus 3414 that is connected to the CD-ROM drive 3412 and the FD drive 3411, and a ROM 3415 in which a program such as a startup program is to be stored, and in which a command of an application program is temporarily stored and a temporary storage area is to be provided, and a hard disk 3417 in which an application program, a system program, and data are to be stored. Although not shown, the computer 341 may further include a network card that provides connection to a LAN.

The program for causing the computer system 340 to execute the functions of the reinforcement learning apparatus and the like in the foregoing embodiments may be stored in a CD-ROM 3501 or an FD 3502, which are inserted into the CD-ROM drive 3412 or the FD drive 3411, and may be transferred to the hard disk 3417. Alternatively, the program may be transmitted to the computer 341 via a network (not shown) and stored in the hard disk 3417. At the time of execution, the program is loaded into the RAM 3416. The program may be loaded from the CD-ROM 3501 or the FD 3502, or directly from the network.

The program does not necessarily have to include, for example, an operating system (OS) or a third party program to cause the computer 341 to execute the functions of the reinforcement learning apparatus and the like in the foregoing embodiments. The program may only include a portion of command capable of calling an appropriate function (module) in a controlled mode and obtaining the desired results. The manner in which the computer system 340 operates is well known, and, thus, a detailed description thereof has been omitted.

Furthermore, the computer that executes this program may be a single computer, or may be multiple computers. In other words, centralized processing may be performed, or distributed processing may be performed.

Furthermore, in the foregoing embodiments, each process (each function) may be realized by integrated processing using a single apparatus (system), or may be realized by distributed processing using multiple apparatuses.

The present invention is not limited to the embodiments set forth herein. It will be appreciated that various modifications are within the scope of the present invention.

As described above, the reinforcement learning system according to the present invention has the effect of performing robot motor learning in a quick and stable manner, and is useful as a robot control system and the like.

What is claimed is:

1. A reinforcement learning apparatus comprising:
a reward function storage unit in which a reward function for outputting a reward can be stored;
a first-type environment parameter obtaining unit that obtains a value of one or more first-type environment parameters relating to an environment of a moving control object;
a control parameter value calculation unit that calculates a value of one or more control parameters maximizing a reward that is output by the reward function by substituting the value of the one or more first-type environment parameters into the reward function;
a control parameter value output unit that outputs the value of the one or more control parameters to the control object;
a virtual external force function storage unit in which a virtual external force function for outputting a virtual external force can be stored,
a second-type environment parameter obtaining unit that obtains a value of one or more second-type environment parameters relating to the virtual external force;
a virtual external force calculation unit that calculates the virtual external force by substituting the value of the one or more second-type environment parameters into the virtual external force function;
a virtual external force output unit that outputs the virtual external force to the control object; and
a virtual external force approximator,
wherein the virtual external force approximator comprises:
a function approximator storage unit in which can be stored a function approximator including two or more third-type parameters serving as observable third-type parameters that are at least partially different from the second-type environment parameters and outputting a second virtual external force;
a state information obtaining unit that observes the control object, and obtains one or more pieces of state information relating to a state of the control object;
a second virtual external force calculation unit that calculates the second virtual external force by substituting the state information into the function approximator;
a difference information calculation unit that calculates difference information serving as information relating to a difference between the virtual external force that is output by the virtual external force output unit and the second virtual external force; and
an approximation unit that updates a parameter of the function approximator so as to minimize the difference information.

2. The reinforcement learning apparatus according to claim 1, further comprising:
a determination unit that determines whether the difference information satisfies a predetermined condition; and
a switching unit that switches the virtual external force that is output to the control object from an output of the virtual external force generator to an output of the virtual external force approximator if the determination unit has determined that the difference between the virtual external force that is output by the virtual external force generator and the second virtual external force is small enough to satisfy the predetermined condition.

3. The reinforcement learning apparatus according to claim 1, wherein a two-point reaching movement task, which is a task of reaching a target point while avoiding an obstacle, is solved.

4. The reinforcement learning apparatus according to claim 1,
wherein a coordinate system of the virtual external force is given by relative coordinates corresponding to a specific location of the control object.

5. The reinforcement learning apparatus according to claim 1, further comprising a selection unit that obtains, from the one or more pieces of state information obtained by the state information obtaining unit, one or more pieces of state information having a change greater than a threshold,
wherein the second virtual external force calculation unit calculates the second virtual external force by substituting, into the function approximator, only the one or more pieces of state information obtained by the selection unit.

6. A control apparatus that controls a moving control object using the virtual external force approximator according to claim 1 and the reinforcement learner according to claim 1.

7. A reinforcement learning method for the reinforcement learning apparatus according to claim 1, the method comprising:
a first-type environment parameter obtaining step of obtaining, with the first-type environment parameter obtaining unit, the value of one or more first-type environment parameters relating to the environment of the moving control object;
a control parameter value calculation step of calculating, with the control parameter value calculation unit, the value of one or more control parameters maximizing the reward that is output by the reward function by substituting the value of the one or more first-type environment parameters and the virtual external force into the reward function;
a control parameter value output step of outputting, with the control parameter value output unit, the value of the one or more control parameters to the control object;
a second-type environment parameter obtaining step of obtaining, with the second-type environment parameter obtaining unit, the value of one or more second-type environment parameters relating to the virtual external force;
a virtual external force calculation step of calculating, with the virtual external force calculation unit, the virtual external force by substituting the value of the one or more second-type environment parameters into the virtual external force function;
a virtual external force output step of outputting, with the virtual external force output unit, the virtual external force to the control object;
a state information obtaining step of observing the control object and obtaining, with the state information obtaining unit, one or more pieces of state information relating to a state of the control object;
a second virtual external force calculation step of calculating, with the second virtual external eternal force calculation unit, the second virtual external force by substituting the state information into a function approximator which includes two or more third-type parameters that are at least partially different from the second-type environment parameters and outputting a second virtual external force;

a difference information calculation step of calculating, with the difference information calculation unit, difference information serving as information relating to a difference between the virtual external force that is output by the virtual external force output unit and the second virtual external force; and an approximation step of updating, with the approximation unit, the parameter of the function approximator so as to minimize the difference information.

\* \* \* \* \*